United States Patent
Hatano et al.

(10) Patent No.: US 9,665,959 B2
(45) Date of Patent: May 30, 2017

(54) COMPOSITE IMAGE CREATION ASSIST APPARATUS USING IMAGES OF USERS OTHER THAN TARGET USER, AND NON-TRANSITORY COMPUTER READABLE RECORDING MEDIUM

(71) Applicant: FUJIFILM Corporation, Tokyo (JP)

(72) Inventors: Naoaki Hatano, Tokyo (JP); Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 10 days.

(21) Appl. No.: 14/501,274

(22) Filed: Sep. 30, 2014

(65) Prior Publication Data
US 2015/0092070 A1    Apr. 2, 2015

(30) Foreign Application Priority Data
Sep. 30, 2013 (JP) ................................ 2013-203317

(51) Int. Cl.
*G06T 11/60* (2006.01)
*G06K 9/00* (2006.01)

(52) U.S. Cl.
CPC .......... *G06T 11/60* (2013.01); *G06K 9/00677* (2013.01)

(58) Field of Classification Search
CPC ....................................................... G06T 11/60
See application file for complete search history.

(56) References Cited

U.S. PATENT DOCUMENTS

| 8,934,661 | B2* | 1/2015 | Dolson | G06F 17/30265 |
| | | | | 382/100 |
| 2008/0080774 | A1* | 4/2008 | Jacobs | H04N 1/00132 |
| | | | | 382/220 |
| 2008/0133649 | A1* | 6/2008 | Pennington | G06F 3/14 |
| | | | | 709/203 |
| 2009/0125560 | A1* | 5/2009 | Munekuni | G06F 17/30265 |

(Continued)

FOREIGN PATENT DOCUMENTS

| JP | 2002-49907 | 2/2002 |
| JP | 2006-11649 | 1/2006 |

(Continued)

OTHER PUBLICATIONS

Machine translation of Japanese Patent Publication No. 2014-182650 A to Soma Hidetomo, published Sep. 29, 2014.*

(Continued)

*Primary Examiner* — Gary C Vieaux
(74) *Attorney, Agent, or Firm* — Young & Thompson

(57) ABSTRACT

There are provided a composite image creation assist apparatus and a composite image creation assist method capable of easily assisting the creation of a composite image using not only an image group that a user himself or herself holds but also images that other users hold. An other user image group extraction section extracts image groups of other users belonging to the same group as a target user based on the registration information of an SNS. A second candidate image selection section selects at least one second candidate image suitable for the composite image from the extracted image groups of other users. A use image determination section determines use images, which are to be used for the composite image, from the plurality of first candidate images and the second candidate image.

21 Claims, 7 Drawing Sheets

(56) References Cited

U.S. PATENT DOCUMENTS

2012/0183239 A1* 7/2012 Tsukagoshi ....... G06F 17/30265
382/305
2013/0156275 A1* 6/2013 Amacker .......... G06K 9/00677
382/118

FOREIGN PATENT DOCUMENTS

JP 2008-146174 6/2008
JP 2014-182650 9/2014

OTHER PUBLICATIONS

JP Office Action, dated Aug. 25, 2015; Application No. 2013-203317.
JP Office Action, dated Dec. 15, 2015; Application No. 2013-203317.

* cited by examiner

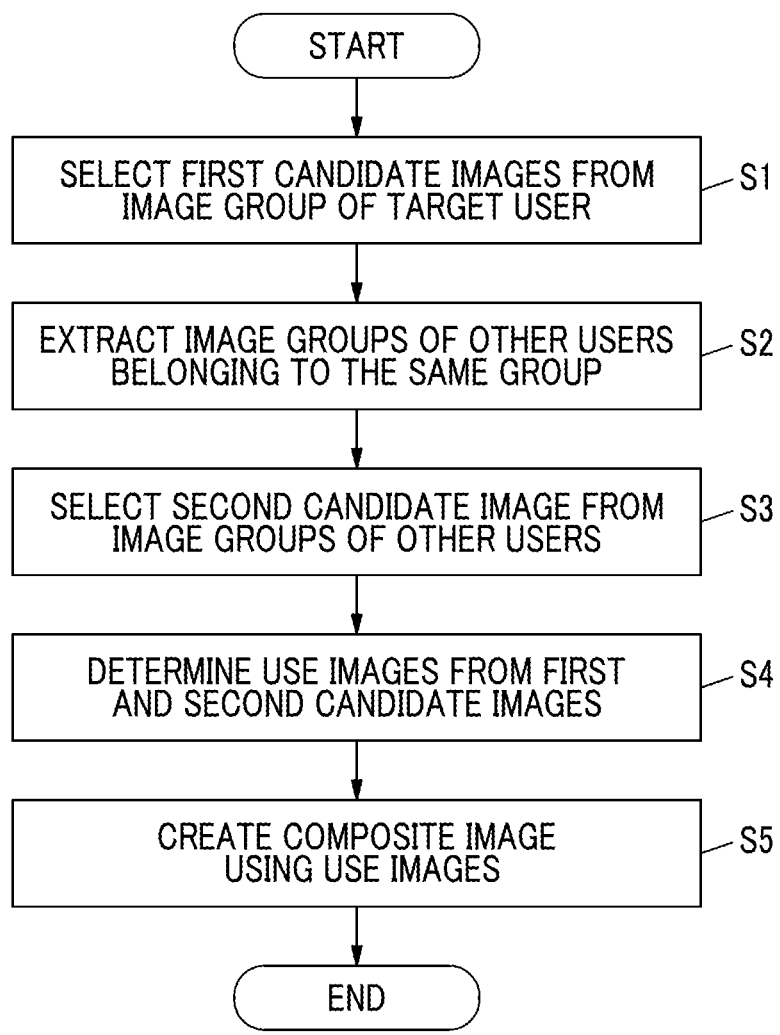

COMPOSITE IMAGE CREATION ASSIST APPARATUS USING IMAGES OF USERS OTHER THAN TARGET USER, AND NON-TRANSITORY COMPUTER READABLE RECORDING MEDIUM

CROSS-REFERENCE TO RELATED APPLICATIONS

The present application claims priority under 35 U.S.C. §119 to Japanese Patent Application No. 2013-203317, filed on Sep. 30, 2013, all of which are hereby expressly incorporated by reference into the present application.

BACKGROUND OF THE INVENTION

1. Field of the Invention

The present invention relates to a composite image creation assist apparatus and a composite image creation assist method, and in particular, relates to an apparatus and a method for assisting the creation of a composite image using images of other users. In addition, the invention relates to a non-transitory computer readable recording medium on which a composite image creation assist program causing a computer to execute such a composite image creation assist method is recorded.

2. Description of the Related Art

In recent years, composite image creation assist services for automatically creating the data of a composite image, such as a photo book or a collage, using an image group of each user created in a social networking service (SNS) have been provided.

By using the composite image creation assist services, even if the user himself or herself does not select and lay out images, a main character, an event, and the like are automatically extracted from the image group created in the SNS, and the selection and arrangement of images suitable for a composite image are performed.

However, images that can be used for the composite image are limited to the image group created by the user himself or herself and held in the SNS, and image groups created in the SNS by other users cannot be used. For example, when a user tries to create a photo book relevant to an event in a school or workplace, if the user can use not only the image group that the user himself or herself holds but also images that classmates, colleagues, and the like hold, it is possible to create a valuable photo book, and this is convenient.

Therefore, JP2006-11649A discloses an electronic album creating apparatus that creates an electronic album including images captured by multiple users by making each user transmit an image to the email address issued for each electronic album.

When the representative of multiple users participating in the creation of an electronic album registers that an electronic album is to be created by inputting the deadline information relevant to the electronic album creation, permission information specifying each user, and instruction information relevant to image selection, image arrangement, and information addition, images are selected from the images, which have been transmitted from each user to the email address assigned by the managing server, according to the instruction information, and the electronic album is created.

SUMMARY OF THE INVENTION

In the apparatus disclosed in JP2006-11649A, however, each user should transmit an image to the specific email address assigned by the managing server. Accordingly, there is a problem in that the image registration work by multiple users is complicated.

In addition, since images are selected based on the information registered by the representative of multiple users, images are selected with a focus on the intention of the representative. Accordingly, there is a possibility that the intention of other users will not be easily reflected in the creation of the electronic album.

The invention has been made in order to solve such problems in the related art, and it is an object of the invention to provide a composite image creation assist apparatus and a composite image creation assist method capable of easily assisting the creation of a composite image using not only an image group that a user himself or herself holds but also images that other users hold.

In addition, it is another object of the invention to provide a non-transitory computer readable recording medium on which a composite image creation assist program causing a computer to execute such a composite image creation assist method is recorded.

According to an aspect of the invention, there is provided an apparatus that assists creation of a composite image using a plurality of first candidate images created by a target user. The composite image creation assist apparatus includes: an other user image group extraction section that extracts image groups of other users belonging to the same group as the target user based on registration information of an image service using a network; a second candidate image selection section that selects at least one second candidate image suitable for the composite image from the image groups of other users extracted by the other user image group extraction section; and a use image determination section that determines use images, which are to be used for the composite image, from the plurality of first candidate images and the second candidate image selected by the second candidate image selection section.

When the plurality of first candidate images are event-based images, the second candidate image selection section may select an image whose photographing date and time and photographing location are close to those of the plurality of first candidate images, as the second candidate image, from the image groups of other users using information added to images. In this case, the second candidate image selection section may further select an image having the same event name as the plurality of first candidate images or a keyword for identifying the same event, as the second candidate image, from the image groups of other users.

In addition, when the plurality of first candidate images are person-based images, the second candidate image selection section may select an image in which the same target person as in the plurality of first candidate images is captured, as the second candidate image, from the image groups of other users by image analysis. In this case, the second candidate image selection section may further select an image having a name of the same target person as in the plurality of first candidate images or a keyword for identifying a name of the target person, as the second candidate image, from the image groups of other users.

When the plurality of first candidate images are scenery-based images, the second candidate image selection section may select an image whose photographing location is close to those of the plurality of first candidate images, as the second candidate image, from the image groups of other users using information added to images. In this case, the second candidate image selection section may further select an image having the same place name as photographing locations of the plurality of first candidate images or a keyword for identifying the same place name, as the second candidate image, from the image groups of other users.

A composite image creation section that creates the composite image using the use images determined by the use image determination section may be further provided.

In addition, a first candidate image selection section that selects a plurality of first candidate images suitable for the composite image from an image group of the target user created in the image service using the network may be further provided, and the use image determination section may determine the use images from the plurality of first candidate images selected by the first candidate image selection section and the second candidate image selected by the second candidate image selection section.

According to another aspect of the invention, there is provided a method of assisting creation of a composite image using a plurality of first candidate images created by a target user. The composite image creation assist method includes: extracting image groups of other users belonging to the same group as the target user based on registration information of an image service using a network; selecting at least one second candidate image suitable for the composite image from the extracted image groups of other users; and determining use images, which are to be used for the composite image, from the plurality of first candidate images and the second candidate image that have been selected.

According to still another aspect of the invention, there is provided a program for assisting creation of a composite image using a plurality of first candidate images created by a target user. The composite image creation assist program causes a computer to execute: a step of extracting image groups of other users belonging to the same group as the target user based on registration information of an image service using a network; a step of selecting at least one second candidate image suitable for the composite image from the extracted image groups of other users; and a step of determining use images, which are to be used for the composite image, from the plurality of first candidate images and the second candidate image that have been selected.

According to still another aspect of the invention, there is provided a non-transitory computer readable recording medium on which the composite image creation assist program described above is recorded.

According to the invention, image groups of other users belonging to the same group as the target user are extracted based on the registration information of the image service using the network, at least one second candidate image suitable for the composite image is selected from the extracted image groups of other users, and use images to be used for the composite image are determined from the plurality of first candidate images and the second candidate image of the target user. Therefore, it is possible to easily assist the creation of the composite image using not only the image group that the user himself or herself holds but also the images that other users hold.

BRIEF DESCRIPTION OF THE DRAWINGS

FIG. 8 is a flowchart showing a composite image creation assist method executed by the composite image creation assist apparatus of the second embodiment.

DESCRIPTION OF THE PREFERRED EMBODIMENTS

Hereinafter, embodiments of the invention will be described with reference to the accompanying diagrams.

First Embodiment

Figure 1:
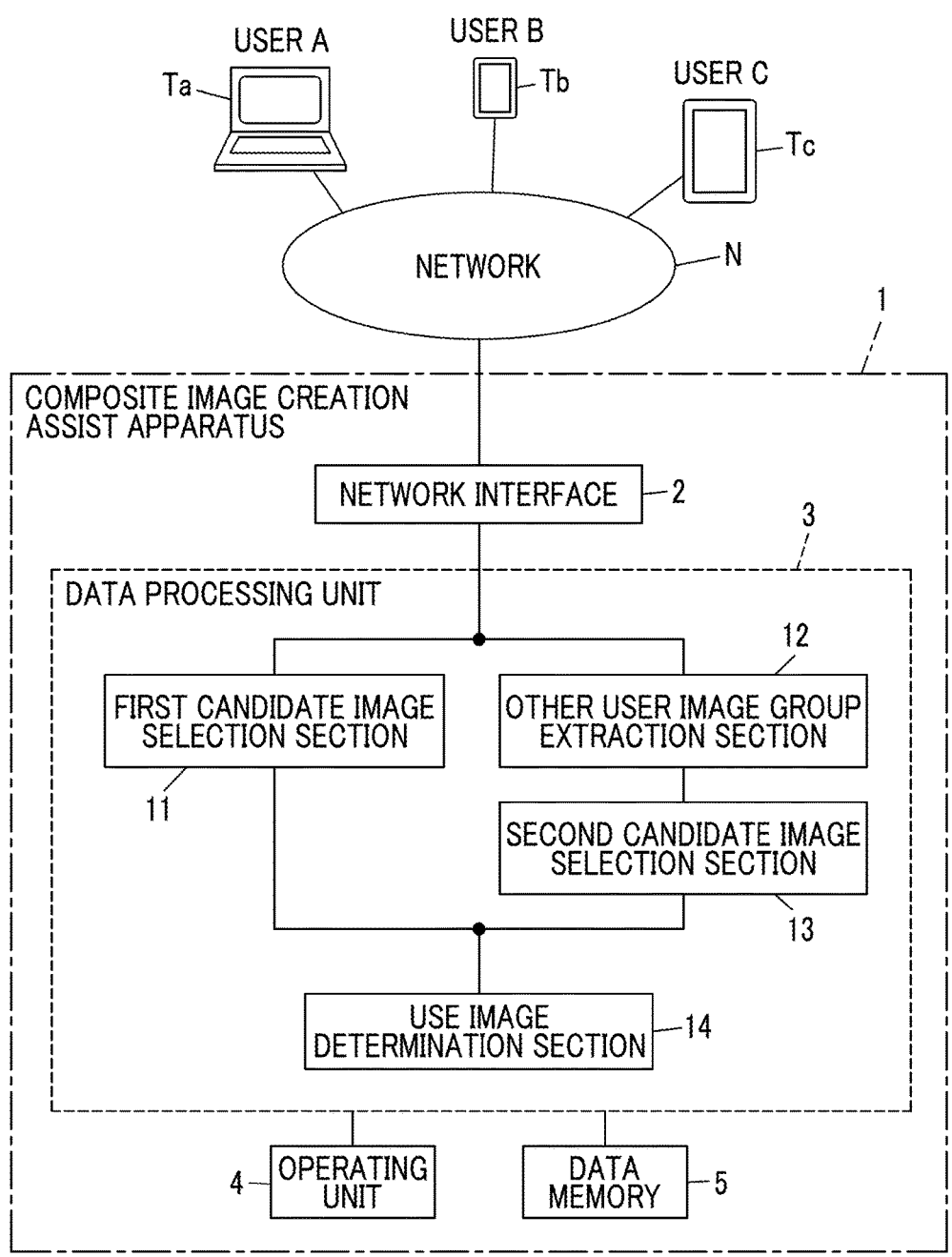
FIG. 1 is a block diagram showing the configuration of a composite image creation assist apparatus according to a first embodiment of the invention.

FIG. 1 shows a composite image creation assist apparatus 1 according to a first embodiment of the invention. The composite image creation assist apparatus 1 creates a composite image, such as a photo book or a collage, and includes a network interface 2 for connection to a network N, such as the Internet. A data processing unit 3 is connected to the network interface 2, and an operating unit 4 and a data memory 5 are connected to the data processing unit 3. The composite image creation assist apparatus 1 is formed by the network interface 2, the data processing unit 3, the operating unit 4, and the data memory 5.

The data processing unit 3 includes a first candidate image selection section 11 and an other user image group extraction section 12 that are connected to the network interface 2. A second candidate image selection section 13 is connected to the other user image group extraction section 12, and a use image determination section 14 is connected to the first candidate image selection section 11 and the second candidate image selection section 13.

The first candidate image selection section 11 selects a plurality of first candidate images, which are suitable for a composite image to be created, from a group of images of a target user that the target user has created in a social networking service (SNS) through the network N. Here, the first candidate image selection section 11 can select an image designated by the target user in the image group of the target user as a first candidate image, or can select a first candidate image automatically based on some criteria.

The other user image group extraction section 12 searches for other users belonging to the same group as the target user based on the registration information of the image service using a network, such as an SNS, and extracts a group of images created in the SNS by other users. Here, the same group is assumed to include not only a group of users having certain attributes in common with the target user but also a user and a group who have any connection with the target user.

The second candidate image selection section 13 selects at least one image suitable for a composite image, which is to be created, from the image groups of other users extracted by the other user image group extraction section 12, and sets the image as a second candidate image.

The use image determination section 14 determines use images, which are to be used for the composite image to be created, from the plurality of first candidate images selected by the first candidate image selection section 11 and at least one second candidate image selected by the second candidate image selection section 13.

The operating unit 4 is used when the target user, who is an operator of the composite image creation assist apparatus 1, performs an input operation, and may be formed by a keyboard, a mouse, a track ball, a touch panel, and the like.

The data memory 5 stores various kinds of data obtained in the data processing unit 3. For example, the plurality of first candidate images selected by the first candidate image selection section 11, the image groups of other users extracted by the other user image group extraction section 12, the second candidate image selected by the second candidate image selection section 13, and the use images determined by the use image determination section 14 are stored in the data memory 5.

Next, a composite image creation assist method executed by the composite image creation assist apparatus 1 will be described with reference to the flowchart of FIG. 2.

In addition, it is assumed that terminals Ta to Tc of users A to C are connected to the network N, the users A to C create albums, in which their respective image groups are included, in the SNS through the terminals Ta to Tc, and information indicating that the users A to C belong to the same group is registered as one piece of the registration information of the SNS. As the terminals Ta to Tc, various kinds of terminal devices that can be connected to the network N, such as a computer, so-called smart devices including a tablet and a smart phone, and a mobile phone, can be used.

In addition, it is assumed that the user A serving as a target user requests the composite image creation assist apparatus 1 to assist the creation of a composite image.

First, when a request for composite image creation assist is input through the operating unit 4 from the user A who is a target user, a plurality of first candidate images suitable for a composite image are selected from an image group of the user A created in the SNS by the first candidate image selection section 11 in step S1.

In this case, the first candidate image selection section 11 can select a plurality of images that the user A himself or herself has designated through the operating unit 4, in the group of images created in the SNS by the user A, as first candidate images. The user A can also designate an album in which a plurality of images are included. In this case, the plurality of images included in the designated album are selected as first candidate images.

For example, when the user A has created a plurality of albums in the SNS, the first candidate image selection section 11 can automatically select an album including a predetermined number of images or more, and the plurality of images included in this album can be set as first candidate images.

The plurality of first candidate images selected in this manner by the first candidate image selection section 11 are stored in the data memory 5.

Then, in step S2, based on the registration information of the SNS, image groups of other users belonging to the same group as the target user are extracted by the other user image group extraction section 12. That is, users B and C belonging to the same group as the user A who is a target user are automatically found from the registration information of the SNS, and image groups created in the SNS by the users B and C are extracted and is stored in the data memory 5.

After the image group of the user B and the image group of the user C are extracted by the other user image group extraction section 12 as described above, at least one second candidate image suitable for a composite image to be created is automatically selected from the extracted image group of the user B and the extracted image group of the user C by the second candidate image selection section 13 in step S3.

The selection of the second candidate image is performed by finding an image relevant to an event, a person, scenery, and the like in common with the plurality of first candidate images, which are selected by the first candidate image selection section 11 and are stored in the data memory 5, using the information such as exchangeable image file format (Exif) tag information that comes with each image, or by image analysis, or using a title, a comment, and the like given to each image when creating an image group in the SNS.

After a second candidate image is selected in step S3, use images used for the composite image to be created are determined by the use image determination section 14 in subsequent step S4. That is, use images used for the composite image are automatically determined from the plurality of first candidate images selected by the first candidate image selection section 11 in step S1 and at least one second candidate image selected by the second candidate image selection section 13 in step S3.

In this case, it is preferable that the use image determination section 14 determine the priority (importance) of each use image and associate the priority with the use image as well as determining each use image.

Here, the selection of a second candidate image in step S3 will be further described.

As a second candidate image, an image having categories, such as an event, a person, and scenery, in common with the first candidate image is found. However, since the feature of the image differs according to the categories, it is preferable to match the method of finding a second candidate image with the feature of the image.

For example, in the following Table 1, various image groups selected as first candidate images K1 to K7 are illustrated, and these image groups have different features.

TABLE 1

| Image group | Target to be designated | Features |
|---|---|---|
| K1 | Designate an album "OO year XX month ΔΔ day, amusement park P" | Event of one day The number of main characters is 2 or more |
| K2 | Designate an album of personal travel | Events of several days The number of main characters is 2 or more |
| K3 | Designate event image groups of school and kindergarten | A plurality of one-day events The number of main characters is 2 or more |
| K4 | Designate an image group of OO year of the user himself or herself | A plurality of events The number of main characters is 2 or more |
| K5 | Designate an image group of children of the user himself or herself | Main characters are limited to designated persons |
| K6 | Designate an image group of scenery | Main characters are not present |
| K7 | Designate other image groups | Main characters are not present |

The first candidate image K1 is an image group selected by designating an album "OO year XX month ΔΔ day, amusement park P". The feature of the image group is that the event of one day has been captured, and the number of main characters is expected to be 2 or more. It is expected that the plurality of main characters appear multiple times as subjects in the image group. That is, the main characters refer to persons frequently appearing as subjects in the image group.

The first candidate image K2 is an image group selected by designating an album of personal travel. The feature of the image group is that the events of several days have been captured, and the number of main characters in the images is expected to be 2 or more.

The first candidate image K3 is selected by designating event image groups of school and kindergarten. The feature of the image group is that there is a plurality of one-day events and images captured in the plurality of events are included, and the number of main characters is expected to be 2 or more.

The first candidate image K4 is selected by designating an image group of OO year of the user himself or herself. The feature of the image group is that images captured in a plurality of events are included, and the number of main characters is expected to be 2 or more.

All of the first candidate images K1 to K4 are event-based image groups captured in events. In order to select second candidate images suitable for such event-based first candidate images, it is preferable to extract images, which are relevant to the same events as the first candidate images, from the image groups of other users using the information indicating the photographing date and time and the photographing location, such as Exif tag information that comes with each image.

The first candidate image K5 is selected by designating a group of images in which children of the user himself or herself are the main subjects. The feature of the image group is that the main characters in images are limited to designated persons.

In order to select a second candidate image suitable for a person-based image group in which a designated person is a main subject, such as the first candidate image K5, it is preferable to extract an image in which the designated person is captured by performing image analysis of each image of the image groups of other users.

The first candidate image K6 is selected by designating a group of images having scenery as a main subject. Accordingly, main characters are not present.

In order to select a second candidate image suitable for such a scenery-based first candidate image, it is preferable to extract images captured at the same photographing location as the first candidate image from the image groups of other users using the information indicating the photographing location, such as Exif tag information that comes with each image.

The first candidate image K7 is selected by designating a group of images having a pet, a car, or the like as a main subject, unlike the other first candidate images K1 to K6. Accordingly, main characters are not present.

In order to select a second candidate image suitable for such a first candidate image, it is preferable to extract an image in which the same subject as in the first candidate image is captured by performing image analysis of each image of the image groups of other users.

Figure 3:
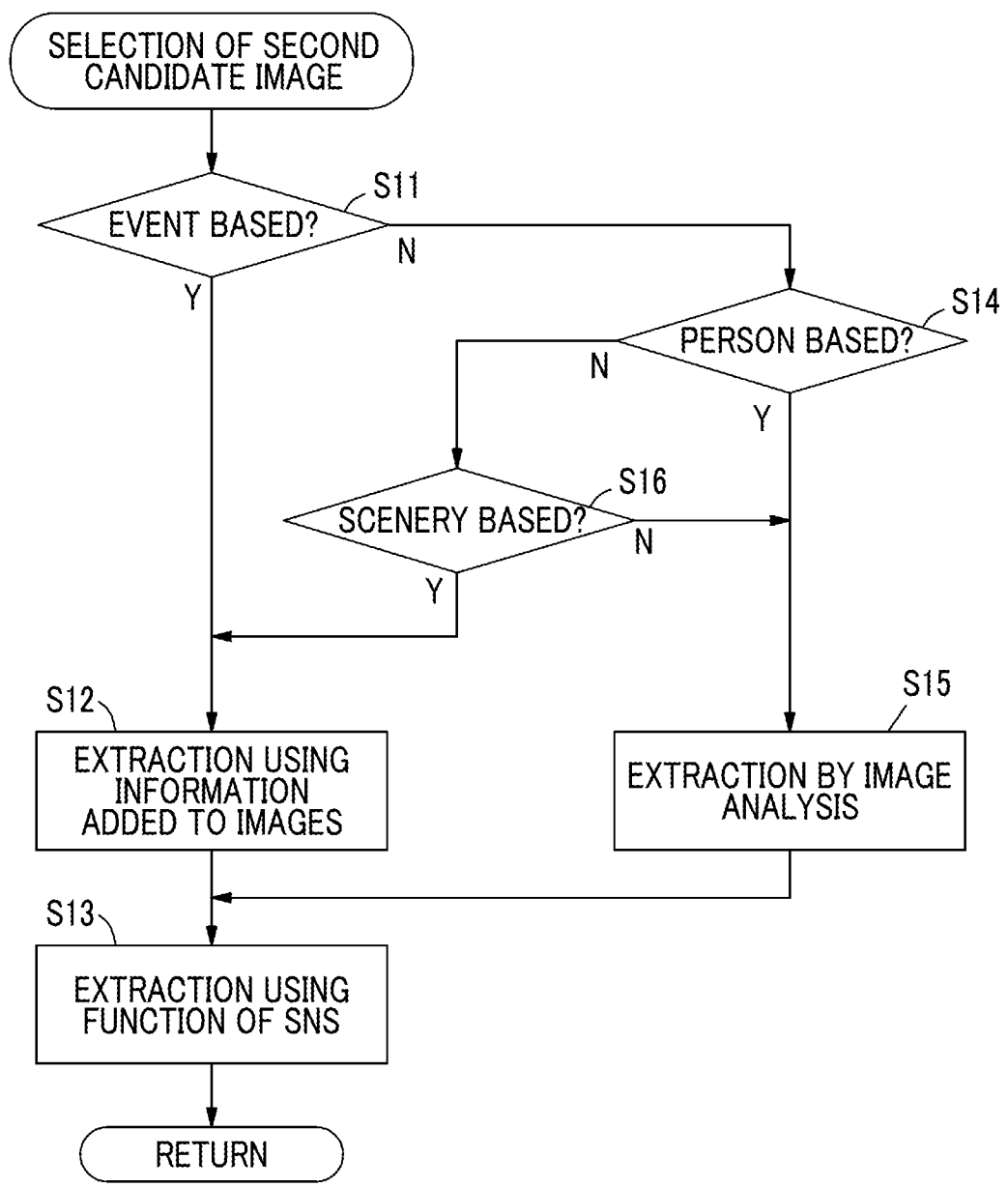
FIG. 3 is a flowchart showing a method of selecting a second candidate image in the first embodiment.

Therefore, it is possible to select a second candidate image according to the flowchart shown in FIG. 3.

First, in step S11, it is determined whether or not a plurality of first candidate images selected by the first candidate image selection section 11 and stored in the data memory 5 are an event-based image group. For example, this determination can be performed according to which feature shown in Table 1 the plurality of first candidate images have by using the information indicating the photographing date and time and the photographing location, such as Exif tag information that comes with the plurality of first candidate images, and performing image analysis of the plurality of first candidate images. For example, when the information indicating the photographing date and time and the photographing location, such as Exif tag information that comes with the plurality of first candidate images, is similar and a result of the image analysis of the plurality of first candidate images shows a feature that a plurality of main characters are present, the plurality of first candidate images can be determined to be an event-based image group.

Then, when it is determined that the plurality of first candidate images are an event-based image group captured in events, the process proceeds to step S12. In step S12, images relevant to the same event as the plurality of first candidate images are extracted from the image groups of other users using the information indicating the photographing date and time and the photographing location, such as Exif tag information that comes with each image.

Figure 4:
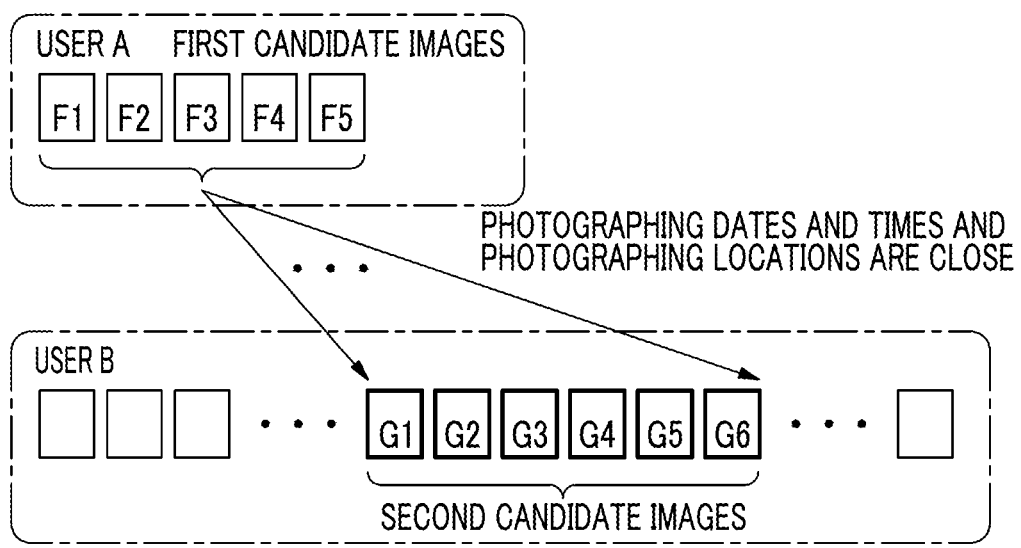
FIG. 4 is a diagram schematically showing an example of the method of selecting a second candidate image in the first embodiment.

For example, as shown in FIG. 4, for event-based images F1 to F5 designated as first candidate images by the user A who is a target user, the second candidate image selection section 13 extracts images G1 to G6, of which photographing dates and times and photographing locations are close to those of the images F1 to F5, from the image group of the user B extracted by the other user image group extraction section 12. These images G1 to G6 are determined to be images relevant to the same event as the images F1 to F5 designated as first candidate images, and are selected as second candidate images. In the same manner, the second candidate image selection section 13 extracts and selects second candidate images from the image group of the user C.

After the extraction and selection of second candidate images using the information that comes with each image in step S12 are completed as described above, the extraction of second candidate images using the function of the SNS is performed in step S13.

That is, the second candidate image selection section 13 extracts images, which have the same event name as the first candidate images or a keyword for identifying the same event, from the image groups of the users B and C who are other users by using the title, comment, and the like given to each image when the users A to C create the image groups in the SNS.

Figure 5:
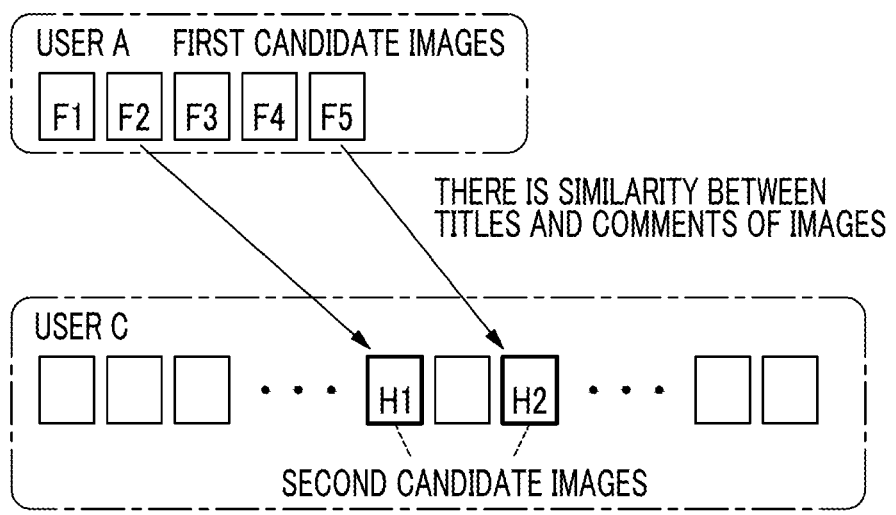
FIG. 5 is a diagram schematically showing another example of the method of selecting a second candidate image in the first embodiment.

For example, as shown in FIG. 5, titles, comments, and the like of the images F1 to F5 designated as first candidate images are compared with titles, comments, and the like given to respective images of the image group of the user C. Then, images H1 and H2 having titles, comments, and the like that are similar to those of the images F2 and F5 in relation to the event, that is, images H1 and H2 including the same event name as the images F1 to F5 or a keyword for identifying the same event are extracted from the image group of the user C, and the images H1 and H2 are selected as second candidate images.

In the same manner, second candidate images are extracted and selected from the image group of the user B using the function of the SNS.

Thus, by using the function of the SNS, a second candidate image can also be extracted and selected from images including no information added to images, such as Exif tag information, for example.

When it is determined that the plurality of first candidate images are not an event-based image group in step S11, the process proceeds to step S14. In step S14, it is determined whether or not the plurality of first candidate images are a person-based image group. This determination can also be performed by checking which feature shown in Table 1 the plurality of first candidate images have. For example, when the main character in the plurality of first candidate images is only one same person, it can be determined that the plurality of first candidate images are a person-based image group.

Then, when it is determined that the plurality of first candidate images are a person-based image group, the process proceeds to step S15. In step S15, images in which the same target person as in the plurality of first candidate images is captured are extracted from the image groups of other users by performing image analysis processing, such as face detection and face recognition, on each image of the image groups of other users.

Figure 6:
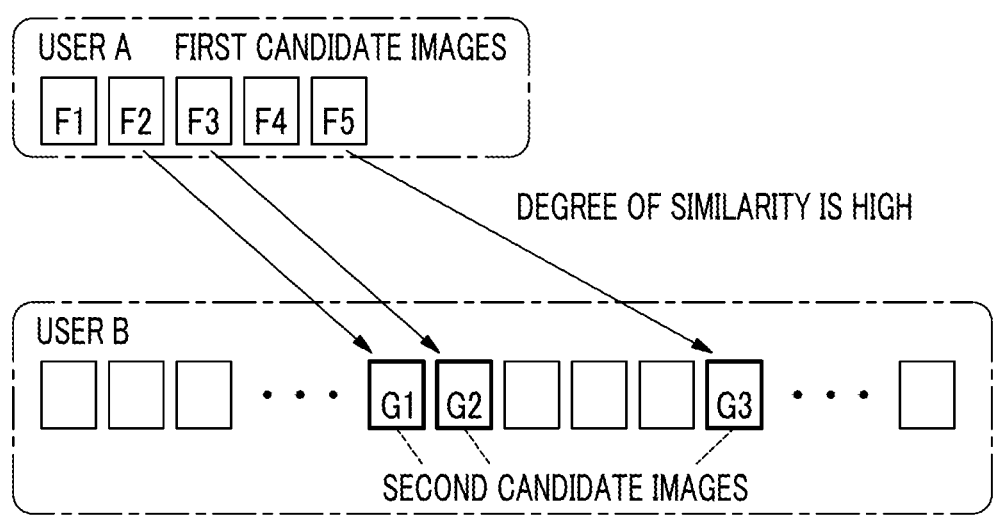
FIG. 6 is a diagram schematically showing still another example of the method of selecting a second candidate image in the first embodiment.

For example, as shown in FIG. 6, the second candidate image selection section 13 performs image analysis of the image group of the user B extracted by the other user image group extraction section 12, and extracts the images G1 to G3 whose degree of similarity with the target person reflected in the images F1 to F5, which have been designated as person-based first candidate images by the user A who is the target user, is equal to or higher than a predetermined threshold value. The images G1 to G3 are determined to be images in which the same target person as in the images F1 to F5 is captured, and are selected as second candidate images. In the same manner, the second candidate image selection section 13 extracts and selects second candidate images from the image group of the user C.

After the extraction and selection of second candidate images by image analysis in step S15 are completed as described above, the extraction of second candidate images using the function of the SNS is performed in step S13.

That is, the second candidate image selection section 13 extracts images, which have the name of the same target person as in the first candidate images or a keyword for identifying the name of the target person, from the image groups of the users B and C who are other users by using the title, comment, and the like given to each image when the users A to C create the image groups in the SNS, and selects the images as second candidate images.

When it is determined that the plurality of first candidate images are not a person-based image group in step S14, the process proceeds to step S16. In step S16, it is determined whether or not the plurality of first candidate images are a scenery-based image group. This determination can also be performed by checking which feature shown in Table 1 the plurality of first candidate images have. For example, when no main character is present as a result of the image analysis for the plurality of first candidate images, it can be determined that the plurality of first candidate images are a scenery-based image group.

Then, when it is determined that the plurality of first candidate images are a scenery-based image group, the process proceeds to step S12. In step S12, images whose photographing locations are close to those of the plurality of first candidate images are extracted from the image groups of other users using the information indicating the photographing location, such as Exif tag information that comes with each image, and are selected as second candidate images.

After the extraction and selection of second candidate images using the information that comes with each image in step S12 are completed, the extraction of second candidate images using the function of the SNS is performed in step S13.

That is, the second candidate image selection section 13 extracts images, which have the same place name as the first candidate images or a keyword for identifying the same place name, from the image groups of the users B and C who are other users by using the title, comment, and the like given to each image when the users A to C create the image groups in the SNS, and selects the images as second candidate images.

When it is determined that the plurality of first candidate images are not a scenery-based image group in step S16, the process proceeds to step S15 since the plurality of first candidate images are neither an event-based image group nor a person-based image group nor a scenery-based image group. Then, image analysis processing is performed on each image of the image groups of other users. As a result, images in which the same subject as in the plurality of first candidate images, for example, a pet, a car, or the like is captured are extracted from the image groups of other users, and are selected as second candidate images.

Then, in step S13, the extraction of second candidate images using the function of the SNS is performed.

That is, the second candidate image selection section 13 extracts images, which have the name of the same subject as in the first candidate images or a keyword indicating the feature of the same subject or the like, from the image groups of the users B and C who are other users by using the title, comment, and the like given to each image when the users A to C create the image groups in the SNS, and selects the images as second candidate images.

In this manner, the selection of second candidate images from the image groups of other users is performed by the second candidate image selection section 13.

When second candidate images are selected as described above, use images used for a composite image to be created are determined by the use image determination section 14. In this case, the use image determination section 14 can determine use images in consideration of the following points.

(1) Among the second candidate images, an image of the same photographing time, photographing location, and composition as the first candidate images is not used as a use image as a general rule. This is because the effect of adding an image from the image groups of other users occurs by using different images from the first candidate images that the target user holds. However, when a first candidate image is a defective image, for example, when there is a defocus or when the eyes of a person as a subject are closed, a second candidate image of the same photographing time, photographing location, and composition as the first candidate image is used as a use image instead of the first candidate image, thereby being able to improve the quality of a composite image. In addition, the same photographing time, the same photographing location, and the same composition mean that the photographing times, locations, and compositions are close to each other, respectively, and are not intended to mean that the times, locations, and compositions exactly match with each other.

(2) When there is an image, in which a user who is a target user is present, among the second candidate images, the image is set as a use image preferentially. Since the number of cases where the user himself or herself is reflected in the image captured by the user himself or herself is small, the use of such a second candidate image is beneficial to the creation of a composite image.

(3) When an image of the same photographing time, photographing location, and composition as the first candidate image is included in the second candidate images, the priority of the first candidate image is increased. The importance of an image can be determined as follows. That is, the importance of an image of the scene captured by the user himself or herself and other users is the highest, the importance of an image of the scene captured by the user himself or herself is the next, and the importance of an image of the scene captured by other users is the lowest. In addition, among the images of the scene captured by other users, an image captured by a larger number of other users can be made to have a higher importance.

When there is an image having a large number of comments among the second candidate images, the priority of the first candidate image corresponding to the image is increased. Therefore, the importance that cannot be determined by image analysis can be estimated.

In addition, when the image size of the first candidate image whose priority has been increased is small, an image displayed by enlarging the image according to the priority becomes rough. In this case, therefore, an image having a large image size among the corresponding second candidate images is used. As a result, it is possible to improve the quality of a composite image.

(4) When creating a composite image in which many persons appear as a group of images captured in the events of school, kindergarten, and circle, for example, second candidate images are actively used so that the number of times of appearance of each person is the same. As a result, it is possible to create a high-quality composite image.

(5) When a second candidate image that needs to be used as a use image has a private setting, an inquiry on whether or not the second candidate image can be used is made to the user in consideration of the service of the SNS.

(6) When using a second candidate image as a use image, the second candidate image is corrected so as to become close to the quality of the first candidate image, in particular, the color of the first candidate image. Therefore, it is possible to suppress the degradation of a composite image due to the use of an image captured by other users.

As described above, according to the composite image creation assist apparatus of the first embodiment, the first candidate image selection section 11 selects a plurality of first candidate images from the image group of the target user created in the SNS, the other user image group extraction section 12 extracts image groups of other users belonging to the same group as the target user based on the registration information of the SNS, the second candidate image selection section 13 selects at least one second candidate image suitable for a composite image from the extracted image groups of other users, and the use image determination section 14 determines use images used for the composite image from the plurality of first candidate images and the second candidate image. Therefore, it is possible to easily assist the creation of a composite image using not only the image group that the user himself or herself holds but also images that other users hold.

Second Embodiment

Figure 7:
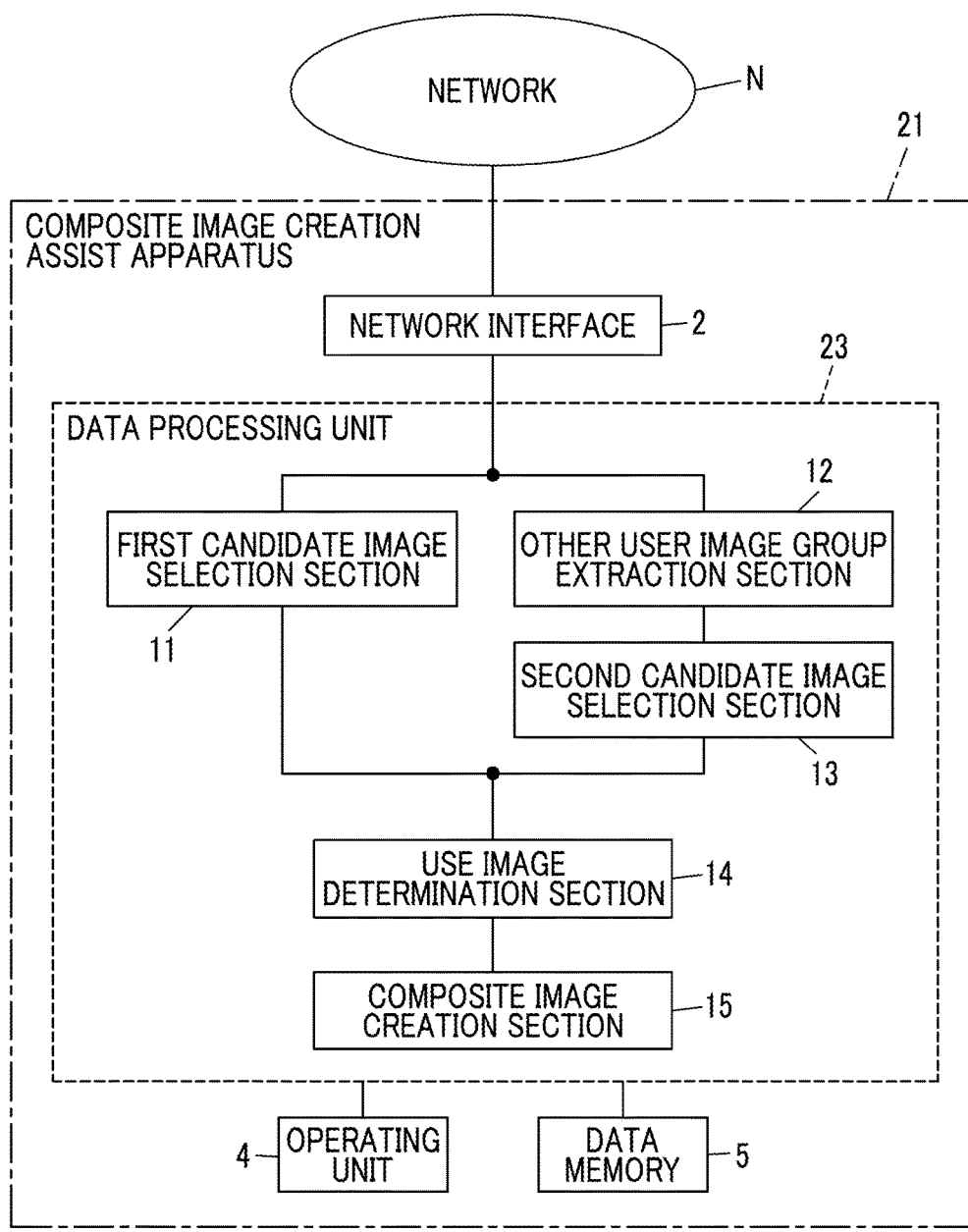
FIG. 7 is a block diagram showing the configuration of a composite image creation assist apparatus according to a second embodiment.

FIG. 7 shows the configuration of a composite image creation assist apparatus 21 according to a second embodiment of the invention. In the composite image creation assist apparatus 21, a data processing unit 23 is used instead of the data processing unit 3 in the composite image creation assist apparatus 1 according to the first embodiment shown in FIG. 1. In the data processing unit 23, a composite image creation section 15 is further connected to the use image determination section 14 in the data processing unit 3.

The composite image creation section 15 creates a composite image using the use images determined by the use image determination section 14.

The other configuration is the same as that of the composite image creation assist apparatus 1 of the first embodiment.

FIG. 8 shows a flowchart of a composite image creation assist method executed by the composite image creation assist apparatus 21 of the second embodiment.

Figure 2:
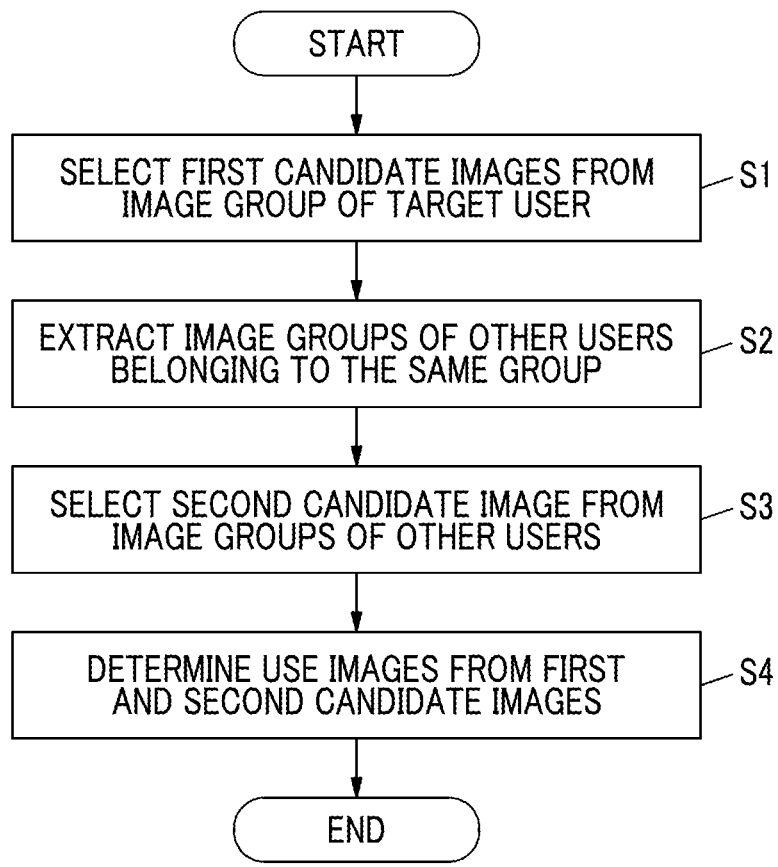
FIG. 2 is a flowchart showing a composite image creation assist method executed by the composite image creation assist apparatus of the first embodiment.

Steps S1 to S4 are the same as the operation in the first embodiment shown in FIG. 2.

After the use images are determined by the use image determination section 14 in step S4, the composite image creation section 15 creates a composite image automatically using the use images determined by the use image determination section 14 in subsequent step S5.

In this case, the arrangement of the use images in the composite image can be performed according to the priority given to each use image. For example, when creating a photo book as a composite image, it is possible to perform predetermined processing, such as using an image with a high priority for the cover of the photo book or placing the image with a high priority in a larger size than an image with a low priority.

Thus, since the composite image creation section 15 is further provided, a composite image, such as a photo book or a collage, can be automatically created by actually using the determined use images, in addition to the determination of use images used for the composite image.

The composite images created in the first and second embodiments include free or paid materials for commercial use and free or paid image content.

In the first and second embodiments, the users A to C create image groups in the SNS. However, the invention can be similarly applied to various kinds of image services using a network, such as communication-based services using an image and storage-based services using an image, without being limited to the SNS.

The selection or extraction of images performed by the first candidate image selection section 11, the other user image group extraction section 12, and the second candidate image selection section 13 may be performed for images acquired in the composite image creation assist apparatus 1 or 21 or for images stored in an external device for image services using a network.

In addition, in the first and second embodiments described above, the first candidate image selection section 11 selects a plurality of first candidate images from the image group of the target user. However, without being limited to this, the first candidate image selection section 11 may not be provided if a plurality of first candidate images suitable for a composite image to be created are determined.

The composite image creation assist apparatus 1 or 21 can be configured using a computer. That is, the data processing unit 3 or 23 can be formed by a CPU and a composite image creation assist program causing the CPU to execute each step of the flowcharts shown in FIGS. 2 and 3 or each step of the flowcharts shown in FIGS. 3 and 8, and the composite image creation assist program can be recorded on a computer readable recording medium. As the computer readable recording medium, it is possible to use various kinds of recording media, such as a hard disk, a flexible disk, an MO, an MT, a RAM, a CD-ROM, a DVD-ROM, an SD card, a CF card, and a USB memory.

What is claimed is:

1. A composite image creation assist apparatus that assists creation of a composite image using a plurality of first candidate images created by a target user, the apparatus comprising:
a processor configured to automatically perform
extracting image groups of other users belonging to a same group as the target user in a social networking service by finding the other users and image groups of other users created by the other users based on registration information of a social networking service,
selecting at least one second candidate image suitable for the composite image from the image groups of other users,
determining use images, which are to be used for the composite image, from the plurality of first candidate images and the one or more second candidate images, and
creating the composite image using the use images.

2. The composite image creation assist apparatus according to claim 1,
wherein, when the plurality of first candidate images are event-based images, the processor selects an image having one or more of a photographing date, a photographing time, and a photographing location the same as the plurality of first candidate images, as the second candidate image, from the image groups of other users using information added to images.

3. The composite image creation assist apparatus according to claim 2, wherein the processor creates the composite image using the use images.

4. The composite image creation assist apparatus according to claim 2, wherein the processor is further configured to select a plurality of first candidate images suitable for the composite image from an image group of the target user created in the social networking service,
wherein the processor determines the use images from the plurality of first candidate images and the one or more second candidate images.

5. The composite image creation assist apparatus according to claim 2,
wherein the processor selects an image having the same event name as the plurality of first candidate images or a keyword for identifying the same event, as the second candidate image, from the image groups of other users.

6. The composite image creation assist apparatus according to claim 5, wherein the processor creates the composite image using the use images.

7. The composite image creation assist apparatus according to claim 5, wherein the processor is further configured to select a plurality of first candidate images suitable for the composite image from an image group of the target user created in the social networking service,
wherein the processor determines the use images from the plurality of first candidate images and the one or more second candidate images.

8. The composite image creation assist apparatus according to claim 1,
wherein, when the plurality of first candidate images are person-based images, the processor selects an image in which the same target person as in the plurality of first candidate images is captured, as the second candidate image, from the image groups of other users by image analysis.

9. The composite image creation assist apparatus according to claim 8, wherein the processor creates the composite image using the use images.

10. The composite image creation assist apparatus according to claim 8, wherein the processor is further configured to select a plurality of first candidate images suitable for the composite image from an image group of the target user created in the social networking service,
wherein the processor determines the use images from the plurality of first candidate images and the one or more second candidate images.

11. The composite image creation assist apparatus according to claim 8,
wherein the processor selects an image having a name of the same target person as in the plurality of first candidate images or a keyword for identifying a name of the target person, as the second candidate image, from the image groups of other users.

12. The composite image creation assist apparatus according to claim 11, wherein the processor creates the composite image using the use images.

13. The composite image creation assist apparatus according to claim 1,
wherein, when the plurality of first candidate images are scenery-based images, the processor selects an image having a photographing location the same as the plurality of first candidate images, as the second candidate image, from the image groups of other users using information added to images.

14. The composite image creation assist apparatus according to claim 13, wherein the processor creates the composite image using the use images.

15. The composite image creation assist apparatus according to claim 13,
wherein the second candidate image selection section further selects an image having the same place name as photographing locations of the plurality of first candidate images or a keyword for identifying the same place name, as the second candidate image, from the image groups of other users.

16. The composite image creation assist apparatus according to claim 15, wherein the processor creates the composite image using the use images.

17. The composite image creation assist apparatus according to claim 1, wherein the processor creates the composite image using the use images.

18. The composite image creation assist apparatus according to claim 1, wherein the processor is further configured to select a plurality of first candidate images suitable for the composite image from an image group of the target user created in the social networking service,
wherein the processor determines the use images from the plurality of first candidate images and the one or more second candidate images.

19. The composite image creation assist apparatus according to claim 1, wherein the at least one second candidate image is selected based on the plurality of first candidate images.

20. A composite image creation assist method of assisting creation of a composite image using a plurality of first candidate images created by a target user using a composite image creation assist apparatus according to claim 1, the method causing a computer to automatically execute:
extracting image groups of other users belonging to a same group as the target user in a social networking service by finding the other users and image groups of other users created by the other users based on registration information of a social networking service;

selecting at least one second candidate image suitable for the composite image from the extracted image groups of other users;

determining use images, which are to be used for the composite image, from the plurality of first candidate images and the one or more second candidate images; and creating the composite image using the use images.

21. A non-transitory computer readable recording medium storing a composite image creation assist program for assisting creation of a composite image using a plurality of first candidate images created by a target user, the program causing a computer to automatically execute:

a step of extracting image groups of other users belonging to a same group as the target user in a social networking service by finding the other users and image groups of other users created by the other users based on registration information of a social networking service;

a step of selecting at least one second candidate image suitable for the composite image from the extracted image groups of other users;

a step of determining use images, which are to be used for the composite image, from the plurality of first candidate images and the one or more second candidate images; and a step of creating the composite image using the use images.

* * * * *